United States Patent [19]

Ackerman

[11] Patent Number: 4,564,325
[45] Date of Patent: Jan. 14, 1986

[54] FLUSH-MOUNTED ROUND BALE MOVER FOR TRUCK BEDS

[76] Inventor: Galen R. Ackerman, R.R. 4, Sabetha, Kans. 66534

[21] Appl. No.: 475,308

[22] Filed: Mar. 14, 1983

[51] Int. Cl.$^4$ .............................................. A01D 87/12
[52] U.S. Cl. .................................... 414/24.5; 414/555
[58] Field of Search .................... 414/24.5, 24.6, 546, 414/555, 684, 911, 554, 551; 212/182, 187; 242/58.6, 65; 280/495; 74/102, 105

[56] References Cited

U.S. PATENT DOCUMENTS

| | | | |
|---|---|---|---|
| 3,625,380 | 12/1971 | Anderson | 414/456 |
| 3,952,895 | 4/1976 | Campbell . | |
| 3,958,772 | 5/1976 | Hynson . | |
| 4,044,963 | 8/1977 | Hostetler . | |
| 4,049,140 | 9/1977 | Roose | 414/24.6 |
| 4,090,624 | 5/1978 | Krein et al. . | |
| 4,091,946 | 5/1978 | Kraeft et al. | 414/555 |
| 4,094,427 | 6/1978 | White et al. . | |
| 4,155,518 | 5/1979 | Small | 414/546 |
| 4,182,590 | 1/1980 | Harkness | 414/24.5 |
| 4,248,450 | 2/1981 | McWethy | 280/495 X |
| 4,298,301 | 11/1981 | Carter et al. . | |
| 4,342,367 | 8/1982 | Gates | 74/102 X |
| 4,458,800 | 7/1984 | Christenson | 74/105 X |

FOREIGN PATENT DOCUMENTS

| | | | |
|---|---|---|---|
| 0113577 | 8/1941 | Australia | 214/77 |
| 2067503 | 7/1980 | United Kingdom | 414/456 |

*Primary Examiner*—Leslie J. Paperner
*Assistant Examiner*—Lyle Kim
*Attorney, Agent, or Firm*—Schmidt, Johnson, Hovey & Williams

[57] ABSTRACT

A round bale loading device is provided that can be stowed in flush mounted relationship with the working surface of a flat bed vehicle. The apparatus includes a pair of cooperating bale gripper arms that are received in grooves in the flat bed surface for stowage, an extensible piston and cylinder assembly coupled to and depending from the underside of the flat bed, and linkage coupling the piston and cylinder with the gripping arms for shifting of the arms from their stowed position to an operation position wherein the arms extend outwardly in bale gripping alignment from the vehicle. The invention provides a conventional flat bed vehicle with the ability to pick up and transport round bales without detracting from the vehicle's ability to transport general purpose loads.

6 Claims, 13 Drawing Figures

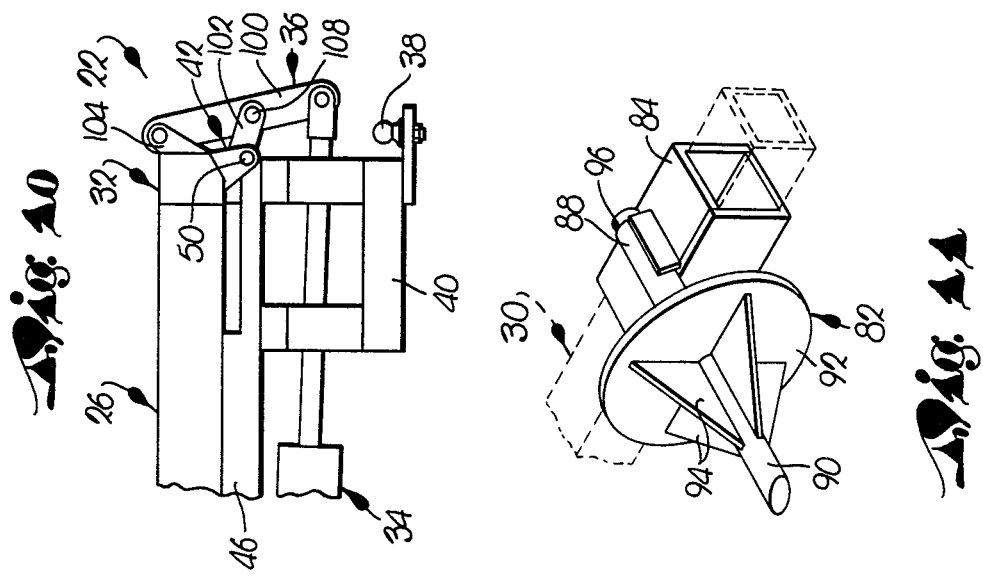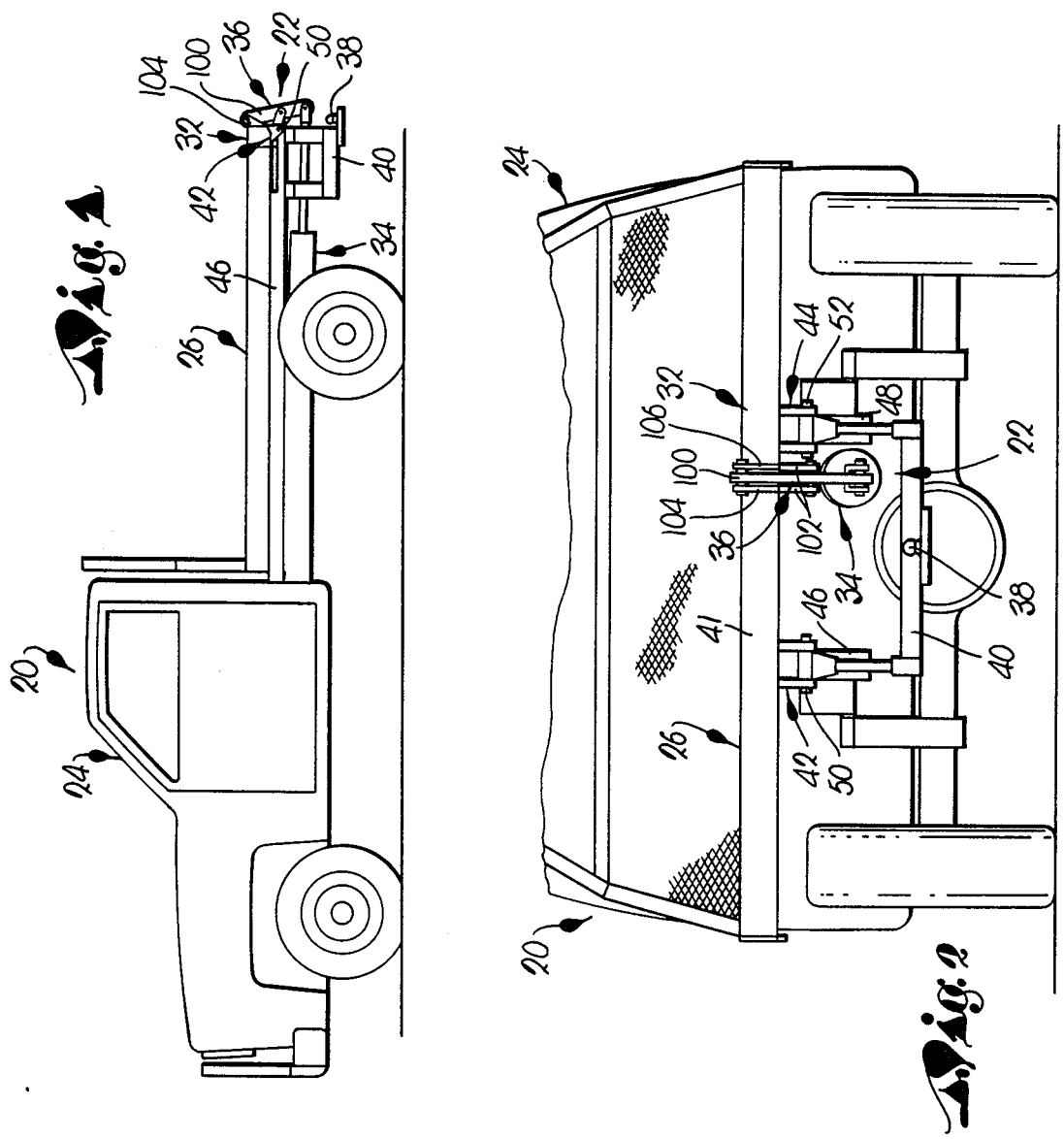

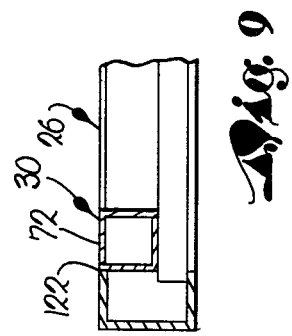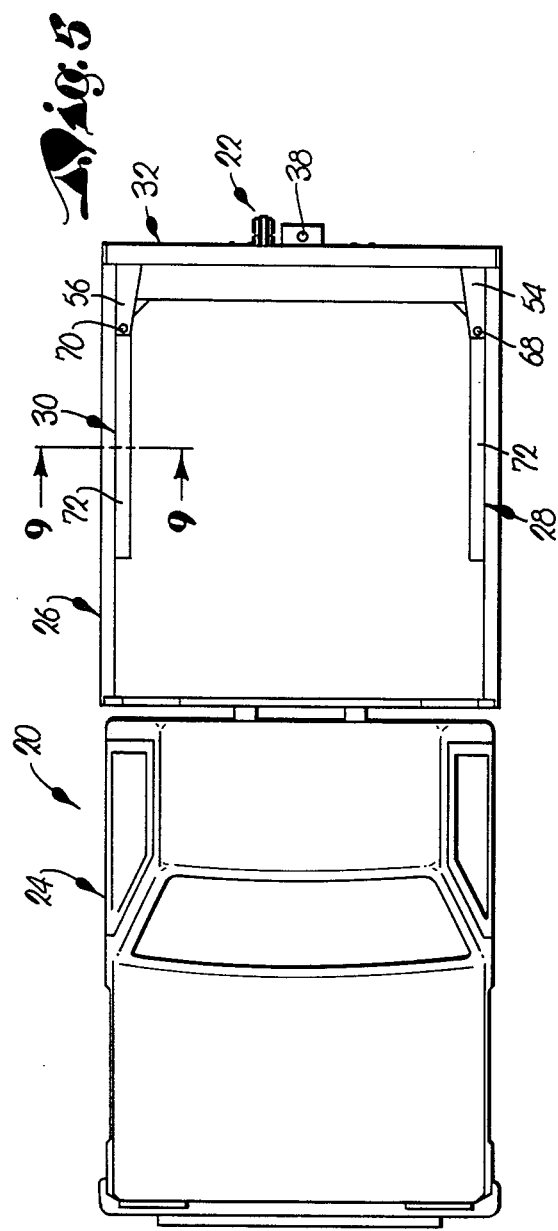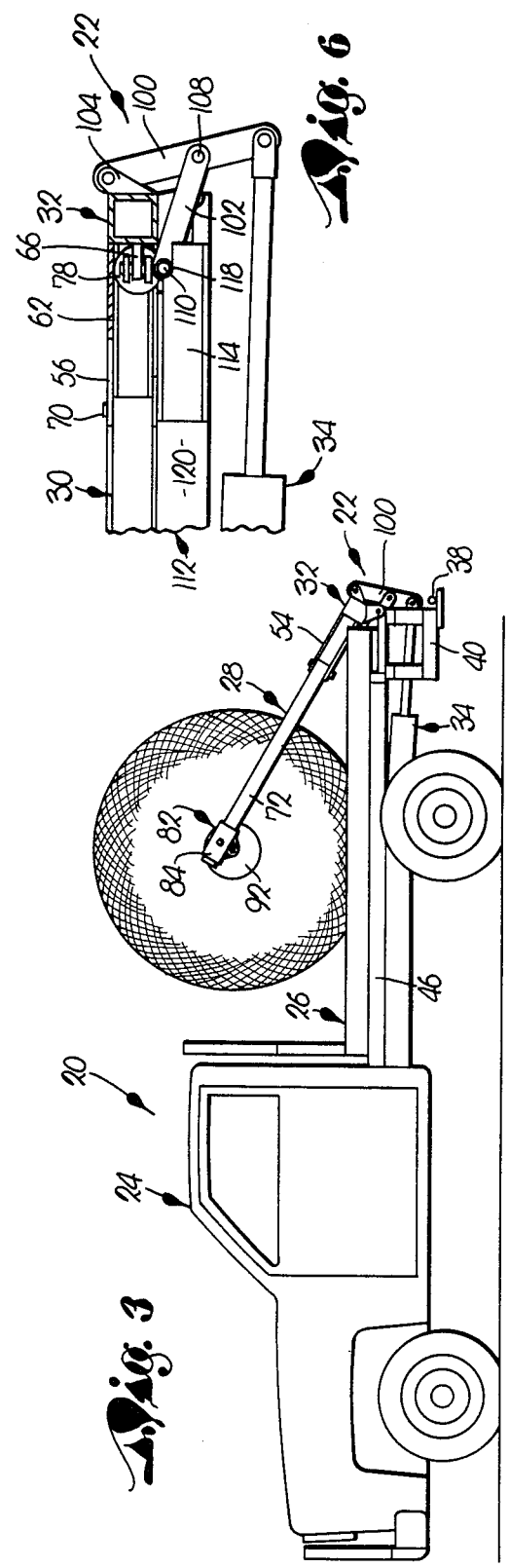

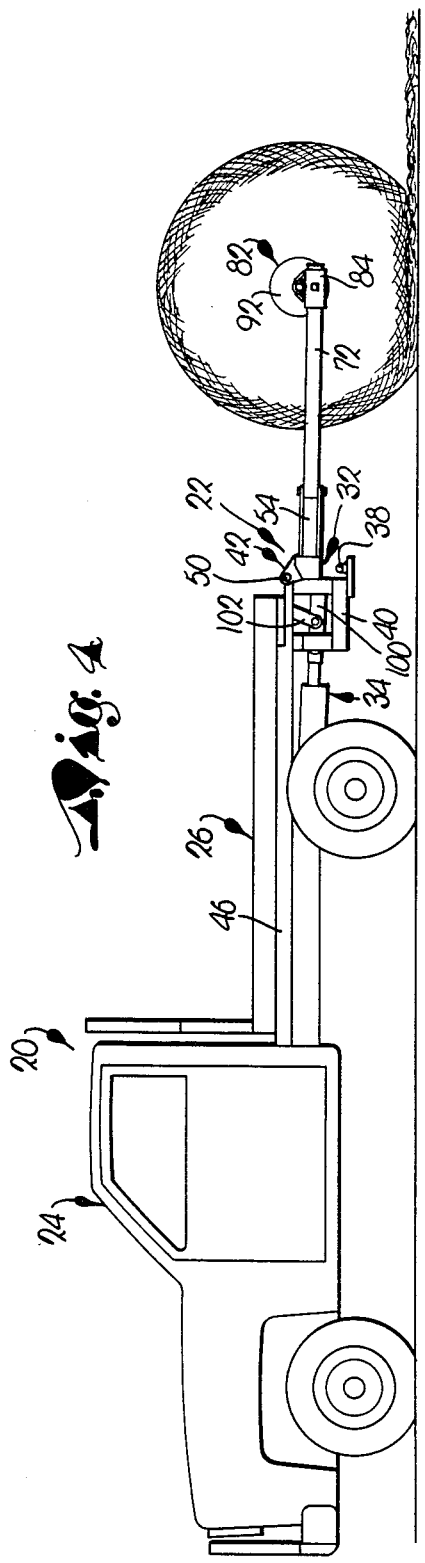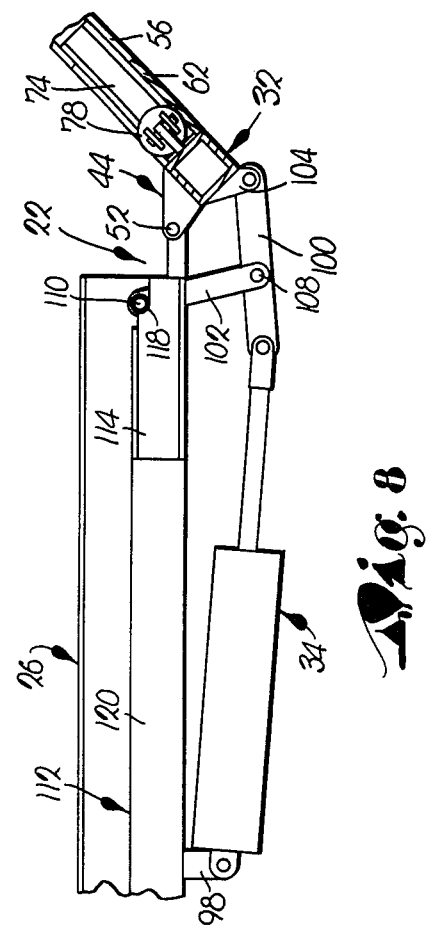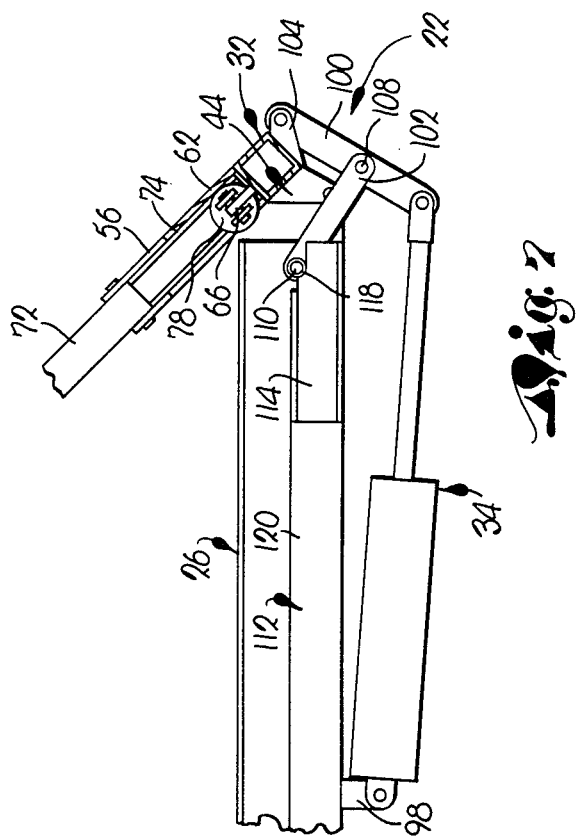

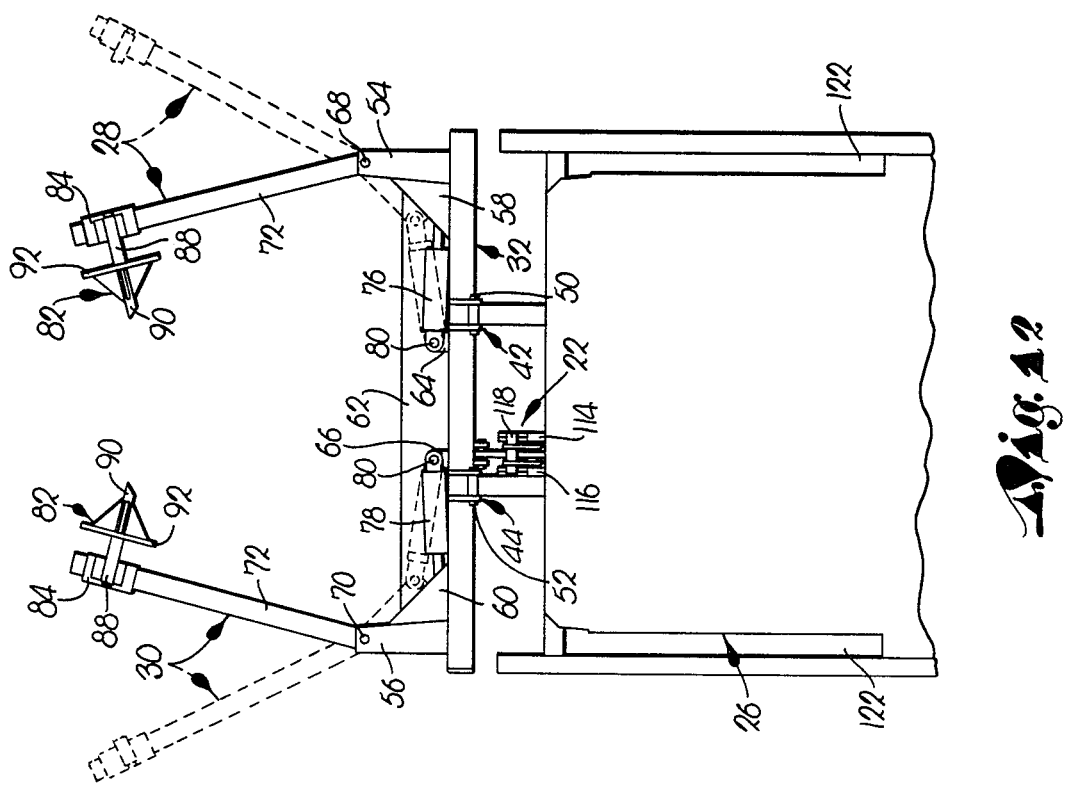
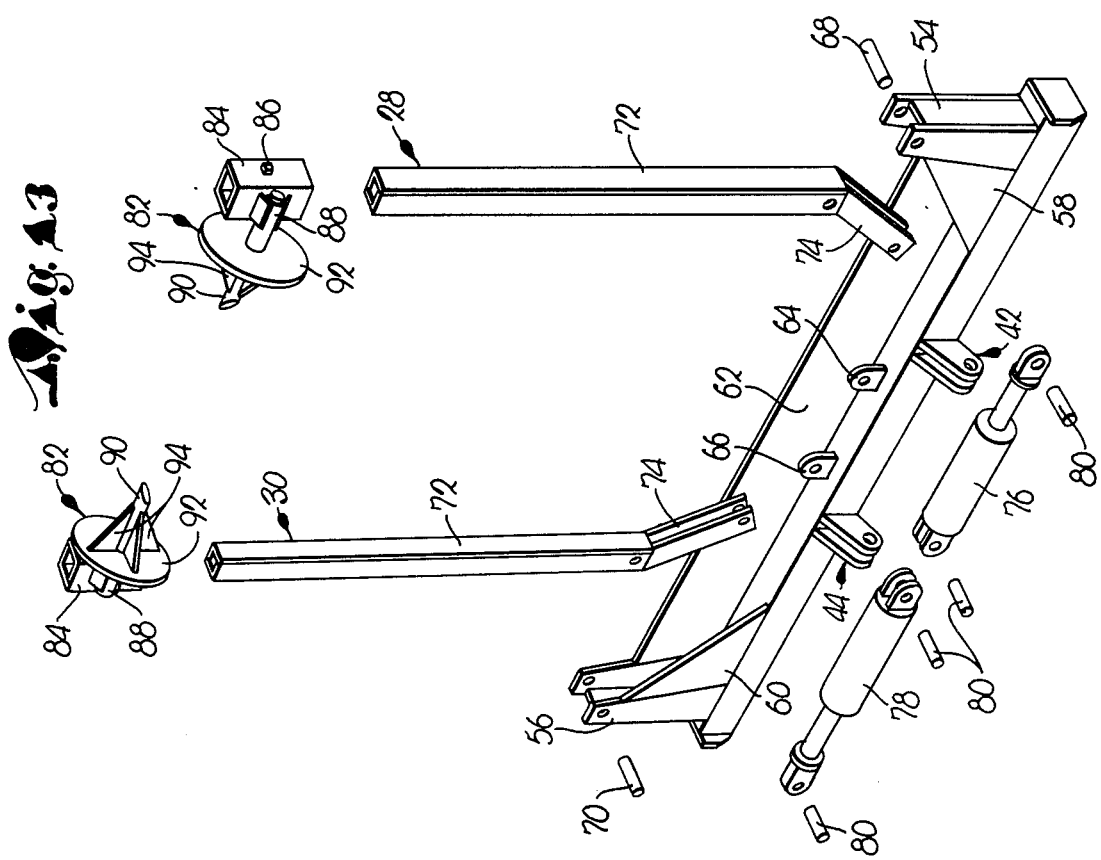

FLUSH-MOUNTED ROUND BALE MOVER FOR TRUCK BEDS

BACKGROUND OF THE INVENTION

1. Technical Field

This invention relates to farm equipment for the handling of round bales of hay or the like. More particularly, it relates to round bale moving equipment that can be flush-mounted on the flat bed of a conventional transport vehicle.

2. Background Art

Round bales typically may be up to five feet in diameter and length and weigh as much as 1,500 pounds. The use of large round bales has several advantages including the fact that round bales need not be transferred from the field and stored under cover. The size of the bales, however, makes it impossible to lift and transport the bales when such is necessary without the use of powered equipment.

In the past, dedicated apparatus for the handling of round bales have been provided such as those described in U.S. Pat. No. 3,958,772 and U.S. Pat. No. 3,952,895. Also, systems suitable for attachment to a conventional flat bed vehicle such as a pick-up truck have been provided, such as those disclosed in U.S. Pat. Nos. 4,090,624, 4,044,963, and 4,298,301. Heretofore, however, there have been no round bale handling systems that could be attached to a conventional flat bed vehicle without taking up a dedicated area of the vehicle's flat bed surface. A person desiring to handle large round bales would therefore have to purchase a separate round bale handler, or would have to convert a general purpose transport vehicle into a dedicated bale handler.

A bale handling attachment for a conventional flat bed vehicle that could be mounted to the vehicle without interfering with the general purpose transport functions of the vehicle would be a decided advantage.

SUMMARY OF THE INVENTION

The problems outlined above are in large measure solved by the flush-mounted round bale mover for truck beds in accordance with the present invention. That is to say, the bale mover hereof may be incorporated into a conventional flat bed vehicle without detracting from the vehicle's general purpose transport function.

The bale moving apparatus in accordance with the present invention broadly includes a pair of cooperating gripping arms pivotally mounted on a supporting cross bar, extensible piston and cylinder means located at the underside of the vehicle's flat bed, and linkage means coupling the piston and cylinder to the gripping arm supporting cross bar. The cross bar is pivotally coupled to the rear edge of the vehicle flat bed, and the cross bar and gripping arms are shiftable from a stowed position wherein the cross bar and gripping arms are flush-mounted with, and comprise a portion of, the working surface of the vehicle's flat bed, to an operating position wherein the gripping arms extend outwardly from the vehicle in bale gripping alignment.

BRIEF DESCRIPTION OF THE DRAWINGS

FIG. 1 is a side elevational view of a flat bed vehicle having a flush-mounted round bale mover in accordance with the present invention mounted thereon;

FIG. 2 is a rear, fragmentary view of the vehicle;

FIG. 3 is a side elevational view of the vehicle with a round bale positioned on the vehicle's flat bed by the bale handling apparatus;

FIG. 4 is a side elevational view of the vehicle with the bale handling apparatus in position for picking up a round bale;

FIG. 5 is a plan view of the vehicle with the bale handling apparatus in its stowed position;

FIG. 6 is an enlarged, sectional, fragmentary view of the rear portion of the flat bed of the vehicle with the bale handling apparatus in its stowed position;

FIG. 7 is an enlarged, fragmentary, sectional view of the rear portion of the vehicle's flat bed with the bale handling apparatus in a partially extended position;

FIG. 8 is similar to FIG. 7 but with the bale handling apparatus in a nearly fully extended position;

FIG. 9 is a fragmentary, sectional view taken along the line 9—9 of FIG. 5;

FIG. 10 is a fragmentary, enlarged view of the rear portion of the vehicle's flat bed with the bale handling apparatus in the stowed position;

FIG. 11 is a perspective view of a bale handling spindle, phantom lines depicting the outermost end of a bale gripping arm;

FIG. 12 is a fragmentary, top view of the rear portion of the vehicle's flat bed with the bale handling apparatus in its fully extended position, phantom lines depicting the bale gripper arms in a spread apart position; and FIG. 13 is an exploded view of the bale handling apparatus in accordance with the present invention.

DETAILED DESCRIPTION OF THE DRAWINGS

Referring to the drawings, a conventional flat bed vehicle 20 is depicted having a flush-mounted bale moving apparatus 22 in accordance with the present invention mounted thereon. Vehicle 20 includes a cab 24 and a flat bed with a generally planar working surface 26.

The bale moving apparatus 22 broadly includes a pair of bale gripping arms 28, 30 mounted on a gripping arm supporting cross bar 32, extensible piston and cylinder means 34 connected to the underside of the vehicle flat bed, and linkage means 36 interconnecting the piston and cylinder assembly 34 with the cross bar 32. A hitch 38 and supporting framework 40, which are separate from the bale handling apparatus 22, depend from the flat bed.

The gripper arm supporting cross bar 32 includes main member 41. Two spaced apart pairs of pivot pin receiving mounts 42, 44 depend from member 41 at inboard locations with respect to opposite ends thereof. The cross bar 32 is pivotally connected to main frame members 46, 48 of the flat bed by pivot pins 50, 52 received through the mounts 42, 44. Generally transversely U-shaped arm supporting channels 54, 56, including triangular strength members 58, 60 project forwardly from cross bar main member 41 adjacent opposite ends thereof, and a rectangular shield 62 interconnects the channels 54, 56. A pair of piston and cylinder supporting flanges 64, 66 extend forwardly from member 41 beneath shield 62 (FIG. 13), and a pair of linkage supports 67 project rearwardly from member 41 generally adjacent the center thereof.

Gripping arms 28, 30 are pivotally coupled to the arm support channels 54, 56 of the cross bar 32 by pivot pins 68, 70. Each gripping arm 28, 30 includes an elongated, square in cross-section, spindle supporting portion 72, and a short, angled in, crank portion 74 fixedly connected to the elongated portions 72 generally beneath shield 62 (see FIG. 13). Each arm 28, 30 has a piston and cylinder assembly 76, 78 that interconnects the crank portion 74 to the support flanges 64, 66 respectively of the cross bar 32. The piston and cylinder assemblies 76, 78 are connected to the flanges 64, 66 and arms 28, 30 with a plurality of pivot pins 80.

A bale piercing spindle 82 is removably carried by each gripping arm 28, 30 adjacent the outer end thereof. Referring to FIGS. 11 and 13, the spindle 82 includes a square-shaped in cross-section sleeve 84 that includes tightening bolt 86 and a transverse, tubular, spindle rod supporting bushing 88. A spindle rod 90 is received within bushing 88. The spindle rod 90 includes a radially extending, circular plate 92, and a plurality of triangular gussets 94 interconnecting the plate 92 and rod 90. Referring to FIG. 11, it will be seen that the spindle rod 90 is retained within bushing 88 by set screw 96.

The cylinder of piston and cylinder assembly 34 is pivotally coupled to projection 98 depending downwardly from the underside of the vehicle. The rod of the piston and cylinder assembly 34 is pivotally coupled to linkage 36. Linkage 36 includes a single main link 100, and supporting link 102. Main link 100 is pivotally coupled to the piston of piston and cylinder assembly 34 at one end thereof, and at the opposed end is pivotally coupled to the linkage supports 67 projecting outwardly from cross bar main member 41. Supporting link 102 includes a pair of spaced apart, parallel link members 104, 106 on either side of main link 100, interconnected at one end thereof to each other and to the midpoint of main link 100 by pivot pin 108. Link members 104, 106 of supporting link 102 are pivotally connected at their opposite ends to bracket 112 by pivot pin 110. Bracket 112 is fixedly connected to the frame member 48 and includes a pair of opposed, outwardly directed C-shaped channels 114, 116, and a bushing 118 welded to each of the channels 114, 116 for receiving the pivot pin 110. Interposed between the two C-shaped channels 114, 116 is a square-shaped in cross-section support member 120. The piston and cylinder assembly supporting projection 98 projects downwardly from the support member 120 such that the piston and cylinder assembly 32, main link 100 and support link 102 are essentially in straight-line alignment in parallel relationship with frame members 48, 46.

Referring to FIG. 9, it will be appreciated that the gripping arms 28, 30 are received within grooves 122 in the working surface of the vehicle flat bed in generally flush-mounted relationship, when the bale moving apparatus 22 is in the stowed position. Moreover, and referring to FIG. 6, it will be appreciated that the shield 62 and main member 41 of cross bar 32 comprise a portion of the working surface of the flat bed when the bale moving apparatus 22 is in the stowed position.

In operation, the bale moving apparatus 22 may be maintained in its stowed position when not in use, and the working surface of the flat bed vehicle may be used for transporting general purpose loads. The bale moving apparatus 22 does not interfere with the use of the vehicle for transporting general purpose loads, since no part of the apparatus 22 extends above the working area of the flat bed.

The gripping arms 28, 30 may be shifted from the stowed position to an operating position wherein the arms extend outwardly from the vehicle in bale gripping alignment by retracting the piston of piston and cylinder assembly 34. Referring to FIGS. 7 and 8, retraction of the piston and cylinder assembly 34 lifts the gripping arms 28, 30 from their stowed position by rotating main link 100 about pivot pin 108, thereby pivoting cross bar 32 about pivot pin 50, 52. Support link 102 pivots around pivot pin 110 to accommodate the downward travel of the main link 100.

Referring to FIG. 12, the piston and cylinder assemblies 76, 78 may be actuated once the gripping arms 28, 30 are fully extended for movement of the arms 28, 30 toward and away from each other about pivots 68, 70 so as to grasp a round bale between the arms 28, 30. The round bale may then be lifted by the gripping arms 28, 30 by extending the piston and cylinder assembly 34. The round bale is positioned on the flat bed of the vehicle (see FIG. 3) by the gripping arms, and may be transported to any desired location. If desired, the bale may be unrolled for livestock feeding purposes by towing it along the ground behind the truck 20 as illustrated in FIG. 4, during which the spindles 82 rotate in their respective bushings 88.

It will be appreciated that the total lack of obstructions by the apparatus of the present invention when arms 28 and 30 are stowed in the bed 26 as illustrated in FIGS. 1 and 5 provides a degree of utility for the bed 26 heretofore unavailable in truck-mounted bale movers. In this respect, not only does the clear, flat surface of the bed 26 provide space for carrying tools, logs, feed bags or any other item involved in day-to-day farming operations, but it also frees up the bed for use in connection with a goose neck trailer. As is well understood by those skilled in the art, such a trailer has a forwardly and then downwardly projecting hitch portion which is normally coupled with a hitch ball approximately in the center of the bed of the towing vehicle, as opposed to hitching at the rear end of such vehicle. Although not illustrated herein, it will be understood that the bed 26 of the present invention may be provided with a recessed hitch ball covered by a removable plate in the center of bed 26, all of which is in no way obstructed or otherwise interfered with through the presence of the flushly stowed lifting arms 28, 30.

Furthermore, although FIG. 3 illustrates the apparatus of the present invention in connection with a single round bale, it will be understood and appreciated that two bales may be carried by the bed 26 side-by-side with ease. Under such circumstances, the first bale will become pushed up against the rear of the cab 24 when a second bale has been lifted by the arms 28, 30 up on to the rear end of the bed 26. By keeping the spindles 82 engaged with the ends of the second bale when the latter is positioned on bed 26, such second bale will be prevented from rolling off the bed 26 and will thus also serve to hold the first bale against the rear of cab 24.

For unloading of the two bales, the second bale, still held by the arms 28, 30, is simply lifted from the bed 26 and swung down to the ground in the usual way. Thereafter, even though the first bale is up against the cab 24, the arms 28 and 30 have sufficient length to permit spindles 82 to be pressed into the opposite ends of that bale at some suitable location, although not directly on its longitudinal axis. Such eccentric insertion of the spindles 82 will in no way hamper or impede lifting of the bale from the bed 26 and setting the same on the ground, whereupon the arms 28, 30 may be returned to their flushly stowed position if desired.

I claim:

1. Crop bale handling apparatus comprising:

a platform adapted for attachment to a vehicle above the ground as a load-carrying bed thereof, said platform having a normally upper, flat surface;

a bale lift associated with said platform for loading bales onto and off of said upper surface when the platform is attached to the vehicle and having a pair of elongated, laterally spaced arms; and mechanism coupled with said lift for moving the same between an unfolded, operating position in which the lift projects outwardly from the platform, and a folded up, stored position in which the lift at least generally falls within the confines of the platform, said mechanism including a power device located below said upper surface of the platform, and said platform having clearance slots in said upper surface which receive said arms into an at least generally flush condition with the upper surface when the lift is in said storage position, whereby to render said upper surface unobstructed by said power device and the arms when the lift is in its storage position.

2. Crop bale handling apparatus as claimed in claim 1, wherein said lift is mounted on the platform for swinging movement between said operating and stored positions.

3. Crop bale handling apparatus as claimed in claim 1, wherein said lift is generally U-shaped, having a bight portion interconnecting said arms at one end thereof, said bight portion lying across one end of the platform at least generally flush with said upper surface thereof and said arms extending longitudinally of the platform when the lift is in said stored position.

4. Crop bale handling apparatus comprising:

a platform adapted for attachment to a vehicle above the ground as a load-carrying bed thereof, said platform having a normally flat, upper surface;

a generally U-shaped bale lift at one end of the platform for loading bales onto and off of said upper surface when the platform is attached to the vehicle and including a pair of elongated, laterally spaced arms and a transverse bar interconnecting said arms at one end thereof;

hinge means pivotally coupling the lift with the platform for up and down swinging movement about a normally horizontal, transverse axis; and mechanism coupled with said lift for swinging the same between a lowered, pickup uposition in which the arms of the lift project outwardly from the platform and a raised, stored position in which the lift is swung past vertical with its arms at least generally parallel to the upper surface of the platform, said mechanism including a power device located below said upper surface of the platform to avoid obstructing the latter during operation or storage of the lift, said axis of swinging movement of the lift being located below said upper surface of the platform and in spaced parallelism to the longitudinal axis of the bar in such a manner that the bar lies across said one end of the platform when the lift is in its stored position yet swings downwardly and outwardly away from the platform to facilitate pickup and loading when the lift is lowered into its pickup position, said hinge means being so disposed relative to the upper surface of the platform and the bar of the lift as to cause said bar to be at least generally flush with the upper surface of the platform when the lift is in its stored position, said platform being provided with a member disposed below said upper surface thereof and projecting outwardly and rearwardly therefrom, said hinge means including a mounting lug projecting transversely outwardly from said bar and a pivot connecting said lug with the outer, rear extremity of said member, said platform being provided with clearance slots in its upper surface for receiving said arms into a flush condition with said upper surface when the lift is in said stored position.

5. Crop bale handling apparatus as claimed in claim 4, wherein said hinge means includes a pivot defining said axis of swinging movement of the lift, said power device including a fluid-pressure, extensible and retractable, piston and cylinder assembly having a pivotal connection at one end thereof with said platform, said mechanism further including a link pivotally connected at one end to said piston and cylinder assembly and at the opposite end to said bar of the lift for transmitting the force of the piston and cylinder assembly to the lift along a certain line of action, said mechanism further including structure for preventing said link and said line of action from passing through said axis of swinging movement of the lift from one side to the opposite side thereof during swinging of the lift between said positions notwithstanding movement of an imaginary line of centers between the pivot connection of the piston and cylinder assembly to the platform and the pivot connection of the link to the lift from one side to the opposite side of the axis of swinging movement of the lift during such swinging thereof between said positions, whereby to permit the piston and cylinder assembly to swing the lift through an arc substantially exceeding 90°.

6. Crop bale handling apparatus as claimed in claim 5, wherein said structure includes a second link pivotally connected at one end to the platform and at its opposite end to said first-mentioned link between the opposite ends of the first-mentioned link.

* * * * *